United States Patent [19]

Knox et al.

[11] 4,251,115
[45] Feb. 17, 1981

[54] HYDRAULIC BRAKING SYSTEM

[75] Inventors: Kilbourne H. Knox, Burbank; Stanley R. Bluhm, Manhattan Beach, both of Calif.

[73] Assignee: Crane Co., N.Y.

[21] Appl. No.: 953,866

[22] Filed: Oct. 23, 1978

Related U.S. Application Data

[63] Continuation-in-part of Ser. No. 346,742, Apr. 2, 1973, Pat. No. 4,121,874.

[51] Int. Cl.² ............................................. B60T 8/06
[52] U.S. Cl. ...................................... 303/10; 303/116; 303/117; 303/118; 303/119
[58] Field of Search ........................................ 303/61-63, 303/10, 6 R, 68-69, 84, 40, 13, 14, 30, 48-49, 113-119, 91-99, 100-101, 112, 6 A; 188/181, 152, 345; 244/111

[56] References Cited

U.S. PATENT DOCUMENTS

| 3,503,655 | 3/1970 | Heimler | 303/13 |
| 3,661,427 | 5/1972 | Hodge | 303/116 |

*Primary Examiner*—Douglas C. Butler
*Attorney, Agent, or Firm*—Henry L. Brinks

[57] ABSTRACT

A hydraulic braking system including hydraulically operated brakes and a hydraulic relay valve for controlling the operation of the brakes in response to a mechanical input. The relay valve includes a metering valve having a medial and distal pair of axially-aligned lands with different diameters, defining an annular chamber between each medial and distal land. A modulator is included to provide a skid control capability. The modulator is hydraulically connected to one of the annular chambers, with system hydraulic pressure being provided to the other. This enables the modulator to vary the position of the metering valve as needed to prevent skidding of the wheels being braked.

8 Claims, 2 Drawing Figures

U.S. Patent    Feb. 17, 1981    4,251,115
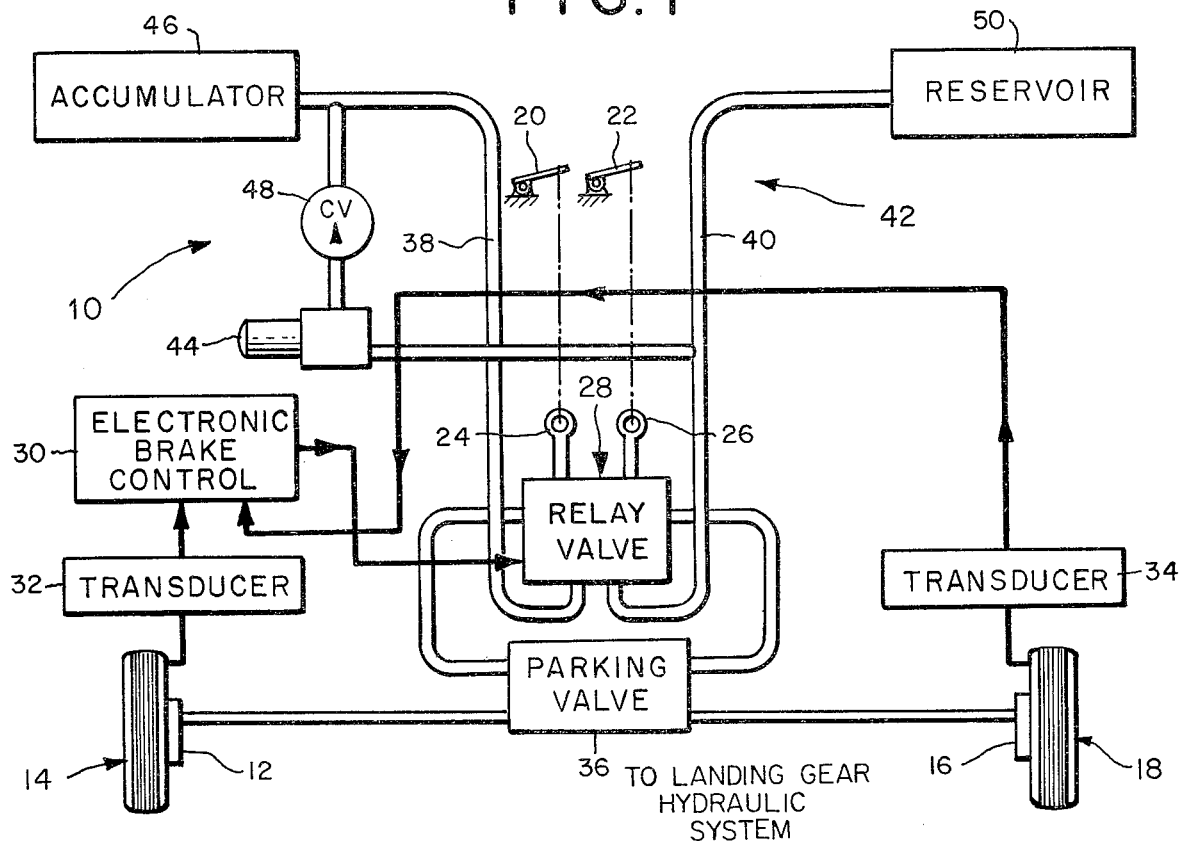
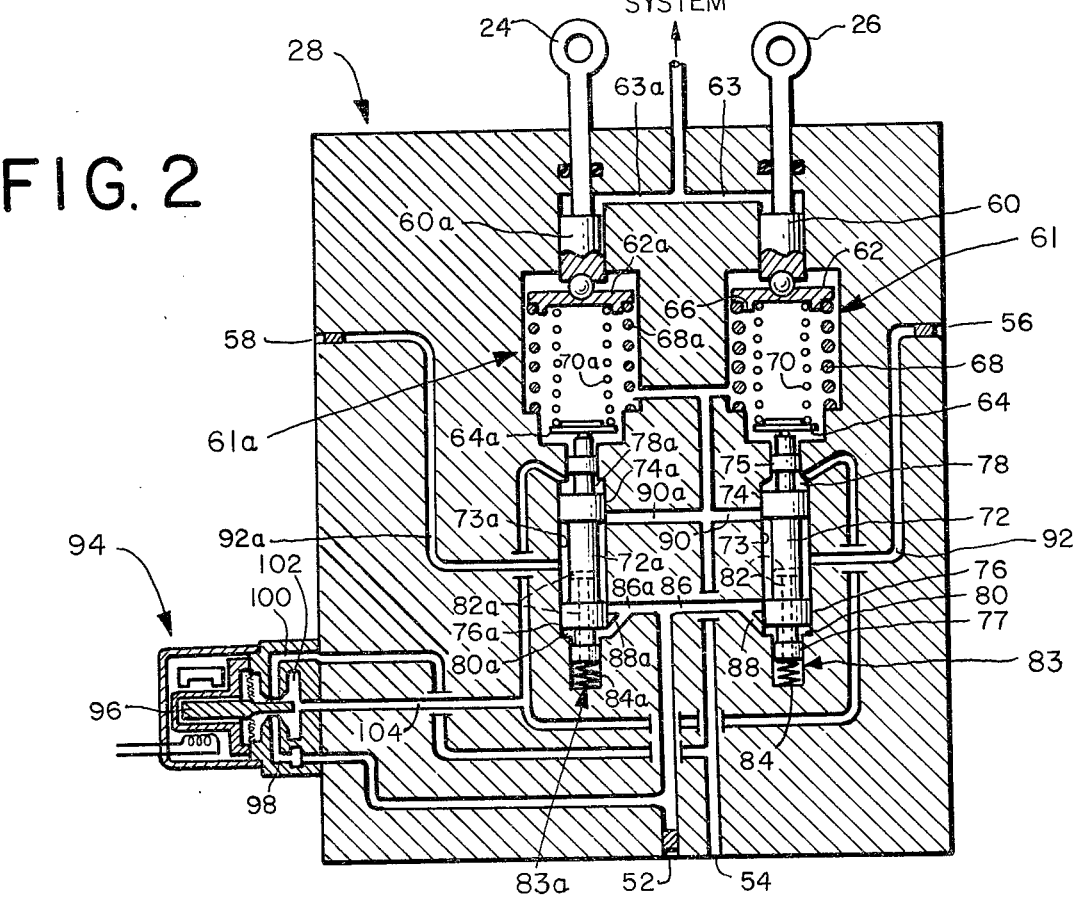

HYDRAULIC BRAKING SYSTEM

This application is a continuation-in-part of application Ser. No. 346,742 filed Apr. 2, 1973, now U.S. Pat. No. 4,121,874, issued Oct. 24, 1978, said patent having the same title.

This invention relates to a hydraulic braking system for a vehicle such as an aircraft. More particularly, this invention relates to a hydraulic braking system having braking means responsive to hydraulic pressure for decelerating the vehicle. The system includes a hydraulic pressure source for supplying system hydraulic pressure, braking control means for sensing deceleration of the vehicle and generating a braking control signal, and a hydraulic relay valve for converting system hydraulic pressure into braking hydraulic pressure. The relay valve includes a mechanically and hydraulically actuable metering valve having a medial and distal pair of axially-aligned lands with different diameters. An annular chamber is defined between each medial and distal land. Modulating means is included in the system, being responsive to the brake control signal to provide an anti-skid capability. The modulating means is hydraulically connected to one of the annular chambers, with system hydraulic pressure being provided to the other. The modulating means is thus able to vary the position of the metering valve as needed to prevent skidding of the wheels being braked.

The relay valve of this invention can be added to the hydraulic braking system of a vehicle such as an aircraft to provide a simplified braking control with superior anti-skid capabilities. However, to take full advantage of the present invention, it should be an original installation. In any event, the power metering valve which was previously thought to be a necessity in high quality hydraulic braking systems, can be eliminated in view of the mechanical input capability of the present invention. Moreover, the so-called "double concentric land" configuration of the metering valve of this invention enables the provision of a relay valve which is far more simple than, yet just as efficient as, prior art designs. This ensures substantial savings in weight, which is of great importance with aircraft. The simplicity of the system also results in improved reliability. When the system is used as an original installation, it will bring about significant cost savings not only because of the simpler relay valve, but also because of the elimination of previously required piping and fittings.

Other features of the invention will become apparent from a review of the detailed description and the drawings. One form of the invention is shown in the drawings in which:

FIG. 1 is a schematic diagram of a hydraulic braking system embodying the present invention and having deceleration control and a mechanical input to the relay valve; and FIG. 2 is a schematic diagram of a relay valve used in the hydraulic braking system of FIG. 1.

Referring to FIG. 1, a hydraulic braking system indicated generally by the numeral 10 is illustrated schematically for use on an aircraft. The hydraulic braking system 10 operates a braking means 12 on the left main wheel 14 and a braking means 16 on the right main wheel 18 of the aircraft. The braking system 10 includes pilot control pedals 20 and 22 which are designed to control the braking of the left and right braking means, respectively. These pedals 20 and 22 are mechanically linked to the left and right input levers 24 and 26, respectively, to the relay valve 28. Provision may be made for changing over between pilot and co-pilot control, but this is conventional in the art so will not be described herein.

The electronic brake control 30 supplies control signals to the relay valve 28 in response to information received from the transducers 32 and 34 on the operation of the left main wheel 14 and the right main wheel 18 of the aircraft. The relay valve 28 in turn reduces the braking pressure being applied to the left main wheel 14 and the right main wheel 18 of the aircraft. The electronic brake control 30 utilized in the hydraulic braking system of the present invention may comprise a conventional form of electronic brake control system known in the art. Typical types of brake control systems suitable for use with the present invention are disclosed in the Anderson U.S. Pat. No. 3,245,727 and the Hirzel U.S. Pat. No. 3,724,916. Thus, the hydraulic braking system of the present invention is not limited to a particular type of electronic brake control system and can utilize electronic brake controls known in the art.

The hydraulic braking system 10 of the present invention also preferably includes a parking valve 36 for maintaining hydraulic braking pressure that has been applied to the braking means 12 for the left wheel 14 and the braking means 16 for the right wheel 18. The parking valve 36 operates to lock hydraulic braking pressure in the lines coupled to the braking means 12 and 16 that has been supplied by the relay valve 28 and maintains the braking pressure after braking pressure is no longer being applied by the relay valve 28.

The relay valve 28 operates to regulate the hydraulic braking pressure in response to inputs from the pilot control pedals 20 and 22, and the electronic skid control mechanism. The relay valve 28 can be added to the braking system of an aircraft which does not have a skid control capability, or can be substituted for a hydraulic braking system of less sophisticated design. Alternatively and preferably, the relay system 28 can be incorporated into the original design of the braking system of the aircraft.

An electronic brake control 30 may be utilized for controlling the deceleration of the aircraft to prevent skidding of the main wheels 14 and 18 during the braking operation. The electronic brake control 30 receives signals from transducers 32 and 34 associated with the left main wheel 14 and the right main wheel 18, respectively, of the aircraft. The transducers 32 and 34 detect movement of the left wheel 14 and the right wheel 18, respectively. Thus, when a wheel approaches a skid, the transducer 32 or 34 detects the skidding condition of the wheel.

The relay valve 28 is coupled to a hydraulic system pressure line 38 and to a hydraulic return line 40. The system pressure line 38 and the return line 40 are in turn coupled to a powered hydraulic source 42. The powered hydraulic source 42 may comprise either an existing powered hydraulic source present on the aircraft or a self-contained powered hydraulic source that can be added to the hydraulic braking system of an aircraft along with the relay valve 28.

The powered hydraulic source 42 includes a hydraulic pump 44 that is preferably electrically operated to provide a pressurized flow of hydraulic fluid. The hydraulic pump 44 supplies a flow of hydraulic pressure to an accumulator 46 and to the system pressure line 38 through a conventional check valve 48. A hydraulic reservoir 50 receives hydraulic fluid from the return line 40 and supplies hydraulic fluid to the hydraulic pump 44.

Referring to FIG. 2, a schematic diagram shows the internal configuration and operation of the relay valve 28. The relay valve 28 has a system pressure port 52 that receives system hydraulic pressure from the system pressure line 38. A system return port 54 on the relay valve 28 is coupled to the system return line 40 for returning hydraulic fluid from the relay valve.

Preferably, filters are placed in all ports of the relay valve 30 with the exception of the system return port 54 to prevent contaminants from entering the relay valve 28. The relay valve 28 also may preferably include a pressure sensor for sensing an upper pressure limit and a lower pressure limit for the system pressure entering the system pressure port. This pressure sensor is not shown since it is clearly depicted and described in the parent application. If desired, the pressure sensor can be used to control operation of the hydraulic pump 48 to maintain system pressure. Alternatively or additionally, a relief valve (not shown) may be included which would dump system pressure into the return line to prevent excessive pressure from building up within the relay valve 28.

As mentioned above, the relay valve right input lever 26 is mechanically controlled by the pilot's (or co-pilot's) right brake pedal 22. When this pedal 22 is depressed, a right brake pressure port 56 on the relay valve 28 supplies braking pressure to the braking means 16 on the right wheel 18. Similarly, when the pilot (or co-pilot) depresses the left brake pedal 20, a left brake pressure port 58 on the relay valve 28 supplies braking pressure to the braking means 12 on the left wheel 14. In the preferred, depicted design the right and left brake pressure controls are identical. Accordingly, in describing the relay valve, only the right side of the valve will be discussed. When numerals are used to designate portions of the right side of the relay valve, the same numeral plus the suffix "a" will identify the corresponding part on the left side.

The input lever 26 is connected to a control piston 60 which provides a mechanical input to the spring metering assembly 61. The upper surface of the control piston 60 is open to the landing gear hydraulic system pressure by cavity 63. Therefore, an increase in the landing gear hydraulic system pressure, such as occurs when the landing gear is retracted, forces control piston 60 downwardly, thereby braking the right wheel 18. The left wheel 14 would, naturally, be braked in the same fashion.

The spring metering assembly 61 includes an upper and lower seat 62 and 64, respectively. The upper spring seat 62 includes an annular rib 66, thus adapting the upper seat 62 to receive two springs, one on either side of the rib. The outer or response spring 68 is designed to provide a pedal feel to the pilot by returning the input lever 26 and the pedal 22 connected thereto to the neutral position in the absence of pressure by the pilot. The smaller, inner or control spring 70 is mounted via the lower spring seat 64 to the metering valve 72. The metering valve 72 is positioned in a metering valve chamber 73 and includes a medial and a distal pair of axially aligned lands. The medial lands 74 and 76 have the same outer diameter, which is greater than that of the distal lands 75 and 77. The lands of the metering valve 72 thus define an upper and a lower annular chamber 78 and 80. The metering valve 72 is ported at 82 to transmit braking pressure to the chamber 83 below the metering valve. A metering chamber spring 84 is positioned in this chamber 83 to provide an upward force to balance any gravititational downward force on the assembly. This spring also acts to bias the metering valve toward its neutral or equilibrium position.

A system pressure cavity 86 provides system pressure to the metering valve 72. It includes an angular leg 88 which leads into the lower annular cavity 80 thereby providing full system pressure to this cavity. A return cavity 90 also leads to the metering valve 72, as well as to the spring metering assembly 61 to vent same. A braking pressure cavity 92 is open to the metering valve 72 between the medial lands 74 and 76.

The relay valve includes modulating means which provides deceleration control to prevent skidding of main wheels 14 and 18 of the aircraft. The anti-skid control is achieved by a servo valve 94, shown in FIG. 2, which is mounted on the relay valve 28.

The servo valve 94 is operated by electrical signals received from the electronic brake control 30 in providing anti-skid control, and utilizes the metering valve 72 to control the braking pressure which is applied to the braking means 12 and 16. The servo valve 94 includes a flapper valve 96 which regulates pressure and flow between a system pressure nozzle 98, a return pressure nozzle 100, and the upper annular chamber 78 of the metering valve.

In operation when braking is not taking place, the metering valve is in the neutral or equilibrium position depicted in FIG. 2. Pressure is provided at the lower annular chamber 80. Because the lower medial land 76 has greater surface area within the chamber than does the lower distal land 77, an upward force is exerted on the metering valve 72.

In the depicted position the servo valve flapper 96 blocks the return nozzle 100 and sends system pressure to the upper annular chamber 78 via the anti-skid control nozzle 102. Since the upper medial land 74 has greater surface area within the metering valve chamber 73 than does the upper distal land 75, a downward force is exerted on the metering valve 72. As previously mentioned, system pressure is also provided to the lower annular chamber 80. Because the two medial lands 74 and 76, and the two distal lands 75 and 77, have identical diameters, the upward and downward forces on the metering valve 72 are perfectly balanced. When the metering valve 72 is in this equilibrium position, the return cavity 90 is blocked, thereby maintaining the brake pressure within the metering valve chamber 73.

When an increase in braking pressure is required, the pilot depresses the control pedal 22 which results in a downward force on the input lever 26. This force compresses the response spring 68, with the downward movement being transmitted via the control spring 70 to the metering valve 72. As the metering valve 72 is displaced downwardly, system pressure is admitted into the metering valve chamber 73 and into the braking pressure cavity 92. This causes the right wheel 18 to be braked by the right wheel hydraulic brake 16. During downward movement of the metering valve 72, the metering valve port 82 acts to convey brake pressure into the cavity 83 below the metering valve.

The flow of system pressure into the braking pressure cavity 92 continues until a force balance on the metering valve 72 exists and the metering valve is placed in the equilibrium position shown in FIG. 2. In the equilibrium position, the force of the hydraulic pressure in the braking pressure cavity 92 and in the cavity 83 below the metering valve 72, is equal to the downward force applied by the control spring 70 and force generated by pressure in upper cavity 78.

If additional braking pressure is needed, the pilot will depress the control pedal 22 somewhat further, thus raising the pressure in the braking pressure cavity 92 until the forces on the ends of the metering valve 72 are balanced, at which time the metering valve will return to the equilibrium position.

When the pilot releases the control pedal 22, the metering valve 72 will move upwardly, exposing the return cavity 90 into which the brake pressure will be dumped.

It will be appreciated that the design of the metering assembly can be varied in order to vary the pressure in the braking pressure cavity 92 in response to changes in the position of the control levers 24 and 26. However, the hydraulic pressure produced in the braking pressure cavity 92 cannot exceed the system pressure available in the system pressure cavity 86.

The anti-skid system of this invention overrides normal braking control in the event that skidding is sensed by the electronic brake control 30. In the absence of an anti-skid control signal, flapper 96 that extends into cavity 102 of the servo valve 94, is held against the return pressure nozzle 100. This is the position depicted in FIG. 2. In this condition, system pressure is provided to the upper annular chamber 78 as described above, thereby permitting normal operation of the metering assembly.

The servo valve 94 responds to electrical control signals from the electronic control unit 30 by alternately moving the flapper 96 to block the system pressure nozzle 98 and open the return pressure nozzle 100 or to block the return nozzle 100 and open the system nozzle 98. Thus, the servo valve 94 is able to modulate the hydraulic pressure in the anti-skid cavity 104 and the upper annular chamber 78 connected thereto in response to signals from the electronic brake control 30.

If skidding of the wheels is sensed by the electronic brake control 30, the flapper 96 is moved from the depicted position, to uncover the return nozzle 100 and cover the system pressure nozzle 98. This dumps system pressure from the anti-skid control cavity 102 and the upper annular chamber 78 into the return nozzle 100 and the return cavity 90. This results in the pressure in the upper annular chamber 78 being substantially less than that in the lower annular chamber 80 which is still provided with system hydraulic pressure by the angular leg 88 of the system pressure cavity 86. The metering valve 72 is thus forced upwardly, opening the return cavity 90. This dumps the brake pressure from the braking pressure cavity 92 into the return cavity 90 until equilibrium is attained. Thus, the effect of hydraulic pressure being lost in the anti-skid cavity 104 is to decrease the braking pressure in the braking pressure cavity 92. An increase in hydraulic pressure in the anti-skid cavity 104 allows the metering valve to increase the hydraulic pressure in the braking pressure cavity 92, by increasing the pressure in the upper annular chamber 78.

The hydraulic pressure in the anti-skid cavity 104 also affects the metering valve 72a in a similar manner to control braking pressure in cavity 92a. Therefore, the servo valve 94 operates in response to the electronic brake control 30 to reduce the braking pressure being applied by the relay valve 28 to both the left wheel braking means 12 and the right wheel braking means 16. The reduction of braking pressure prevents the main wheels 14 and 18 from locking and skidding during braking operations.

In the relay valve 28 shown in FIG. 2, anti-skid control produced by the servo valve 94 operates to affect the braking pressure being directed to both of the main wheels 16 and 18. Thus, skidding action of either of the main wheels will cause a reduction in braking at both of the main wheels 16 and 18 even if only one of the wheels is in a skidding condition. This is generally desirable in smaller types of aircraft, since differential braking of the main wheels 16 and 18 would cause turning of the aircraft. However, it is sometimes desirable to have independent anti-skid control for each of the main wheels 16 and 18. Such a system is depicted and described in detail in the parent case, so will not be discussed herein.

It is to be understood that various modifications can be made to the disclosed braking system without departing from the scope of the invention, and it is intended to cover in the appended claims all such modifications as fall within the true spirit and scope of the invention.

We claim:

1. A hydraulic braking system for a vehicle including braking means responsive to hydraulic pressure for decelerating the vehicle, a hydraulic pressure source for supplying system hydraulic pressure, braking control means for sensing deceleration of the vehicle and generating a graking control signal, and a hydraulic relay valve for converting system hydraulic pressure into braking hydraulic pressure, said relay valve comprising:
   a system hydraulic pressure first cavity;
   a braking hydraulic pressure first cavity;
   mechanically and hydraulically actuable first metering valve positioned between said cavities, said metering valve including a medial and distal pair of axially-aligned lands having different diameters, with an annular chamber defined between each medial and distal land, one of said chambers being provided with system hydraulic pressure;
   modulating means for reducing braking hydraulic pressure generated by said relay valve in response to said braking control signal, said modulating means being hydraulically connected to the other of said annular chambers so that the axial position of said control valve is adjusted upon modulation of said modulating means to reduce the braking hydraulic pressure generated by said relay valve.

2. The hydraulic braking system of claim 1 wherein said braking means comprise a pair of wheel brakes, and wherein said relay valve further comprises second system hydraulic pressure and braking hydraulic pressure cavities with a second metering valve positioned therebetween, said metering valve having connections to said modulating means which correspond to those of said first metering valve, with said first and second braking hydraulic pressure cavities providing braking pressure independently to the respective wheel brakes.

3. The hydraulic braking system of claim 2 wherein each of said distal lands has a smaller diameter than its adjacent medial land.

4. The hydraulic braking system of claim 1 wherein each of said distal lands has a smaller diameter than its adjacent medial land.

5. The hydraulic braking system of claim 1 wherein said relay valve further comprises means for transmitting system hydraulic pressure supplied by said powered hydraulic source into said braking hydraulic pressure cavity in response to demand for increased braking pressure.

6. The hydraulic braking system of claim 5 wherein said relay valve further comprises a return cavity for returning braking hydraulic pressure in said braking hydraulic pressure cavity to said hydraulic pressure source in response to a demand for reduced braking pressure.

7. The hydraulic braking system of claim 1 wherein said modulating means includes a servo valve for generating a deceleration-control hydraulic pressure in response to the braking control signal from said braking control means, said deceleration-control hydraulic pressure acting on said metering valve to reduce the braking hydraulic pressure generated by said metering valve.

8. The hydraulic braking system of claim 1 further comprising a landing gear hydraulic pressure input to said relay valve to increase the braking hydraulic pressure in response to an increase in the landing gear hydraulic pressure.

* * * * *

UNITED STATES PATENT AND TRADEMARK OFFICE
CERTIFICATE OF CORRECTION

PATENT NO. : 4,251,115
DATED : February 17, 1981
INVENTOR(S) : Kilbourne H. Knox and Stanley R. Bluhm It is certified that error appears in the above—identified patent and that said Letters Patent is hereby corrected as shown below:

Column 2, lines 6 through 32, should be moved to a point immediately after Column 2, line 53.

Column 6, line 31, delete "graking" and insert therefore --braking--.

Signed and Sealed this

Twenty-second Day of September 1981

[SEAL]

Attest:

GERALD J. MOSSINGHOFF

Attesting Officer

Commissioner of Patents and Trademarks